United States Patent [19]

Ishida et al.

[11] Patent Number: 4,618,235

[45] Date of Patent: Oct. 21, 1986

[54] FOCUS DETECTING DEVICE FOR A CAMERA

[75] Inventors: Tokuji Ishida; Masataka Hamada, both of Osaka, Japan

[73] Assignee: Minolta Camera Kabushiki Kaisha, Osaka, Japan

[21] Appl. No.: 754,282

[22] Filed: Jul. 12, 1985

[30] Foreign Application Priority Data

Jul. 16, 1984 [JP] Japan .................. 59-148091

[51] Int. Cl.$^4$ .................. G03B 3/00; G03B 15/05
[52] U.S. Cl. .................. 354/403; 354/406; 354/415
[58] Field of Search .................. 354/402–409, 354/415; 250/201 AF, 201 PF, 204

[56] References Cited

U.S. PATENT DOCUMENTS

| 4,123,650 | 10/1978 | Hosoe et al. | 354/403 X |
| 4,459,002 | 7/1984 | Sakai et al. | 354/402 |
| 4,469,417 | 9/1984 | Masunaga et al. | 354/404 |
| 4,509,842 | 4/1985 | Taniguchi et al. | 354/402 |
| 4,536,072 | 8/1985 | Taniguchi et al. | 354/403 |
| 4,550,993 | 11/1985 | Taniguchi et al. | 354/402 |

FOREIGN PATENT DOCUMENTS 101612 6/1984 Japan .................. 354/402

Primary Examiner—William B. Perkey
Attorney, Agent, or Firm—Burns, Doane, Swecker & Mathis

[57] ABSTRACT

A focus detecting device includes an image sensor such as a CCD which converts the intensity of the light indicent thereon into the amount of a charge, integrates or accumulates the charge, terminates the integration operation when the level of the integrated charge reaches a given value or when a given integration limit time has lapsed, and outputs the integrated charge as an image signal which in turn is amplified step-by-step in accordance with the brightness of the object for the focus condition detection. Two different integration limit times are provided such that the integration operation is terminated at the shorter time while the focus detection is possible within the shorter time. The integration operation is terminated at the longer integration limit time when the focus detection is impossible with the shorter time and with the image signal given by the integration for the shorter time.

16 Claims, 15 Drawing Figures

FOCUS DETECTING DEVICE FOR A CAMERA

BACKGROUND OF THE INVENTION

1. Field of the invention

Present invention relates to a focus detecting device for a camera, particularly a focus detecting device which detects a focus condition of a camera objective lens in accordance with the output of a charge accumulation type solid state image sensor which receives the image of a target object formed thereon through the objective lens.

2. Description of the Prior Art

A charge accumulation type solid state image sensor such as a CCD (charge coupled device) is composed of a photoelectric converter section for converting the intensity of light incident thereon into an amount of photoelectric charge, a charge accumulation or charge integration section for integrating the converted charge at a rate in accordance with the intensity of the incident light, and a transfer section for transferring the integrated charge as an image signal to an outer circuit. Hence, the integration time required for integrating the charge from zero to a given level depends on the intensity of the incident light, and increases as the intensity of the incident light weakens. In other words, more time is required for the detection of the focus condition as the intensity of the incident light weakens, because it is impossible to detect the focus condition in accordance with the image signal from the image sensor when the amount of the integrated charge is too low.

In a camera which detects the focus condition in accordance with the image signal supplied from such charge integration type image sensor, it is likely to occur that the shaking of a hand-held camera affects the focus detection as the detection takes longer time. When the intensity of the incident light is low, the camera-to-object distance is likely to change and the object image is likely to shake or vibrate on the image sensor during the focus detection, thereby disabling the accurate detection of the focus condition. Additionally, the longer focus detection time sometimes causes missing of exact shutter actuation and disables the focus detecting device from responding to a moving object.

As a countermeasure to cope with the above problems, a U.S. patent application Ser. No. 669,107 assigned to the same assignee as the present application, discloses a focus detecting device wherein the integration time of the image sensor is restricted. When the integration time is expected to be longer than the limit, a fixed time is given for the integration, with the voltage corresponding to the charge integrated during the fixed time being amplified to compensate for the shortage of the integration time. In the focus detecting device of the aforementioned U.S. patent application, the integration time of the image sensor is restricted or limited to 200 m sec and the image signal is multiplied by 2, 4 or 8, e.g. doubled if the integration time is expected to be 400 m sec without restriction, so that a signal is equivalent to the signal to be obtained by the integration for 400 m sec. The integration limit time is decided or designed to be an allowable maximum time for the focus detection. Hence, the problems as discussed above, remain or are not solved sufficiently for the case when the integration time is shorter than the maximum time but considerably long. This is because the integration limit time should be long enough to guarantee a sufficient amount of charge to be integrated by the image sensor. Otherwise, the image signal is too low to be used for the focus detection or the S/N ratio of the signal will be too low to derive the image signal. Thus, with the device proposed by the U.S. patent application, there exists a range wherein the integration time is shorter than the limit but so long that an exact or desired shutter actuation is likely to be missed or that the focus detecting device can not follow or respond to the movement of an object. In such a range, the integration time depends on the light intensity on the image sensor and is not restricted.

Additionally, the focus detecting device of the U.S. patent application is designed only to multiply the level of the image signal by 2, 4 or 8 when the light intensity on the image sensor is low and a fixed time is given for the integration. Hence, focus detection can not be made when the brightness and contrast of an object are so low that it is difficult to discriminate the image signal from noise signals or that even the multiple signals do not suffice for the focus detection.

SUMMARY OF THE INVENTION

It is an object of the present invention to provide a focus detecting device for a camera with a charge integration type image sensor and which device is not affected by shaking of the camera when supported by hand.

Another object of the present invention is to provide the focus detecting device for the camera which is highly responsive and with which the possibility of missing desired shutter actuation chance is less.

A further object of the present invention is to provide the focus detecting device for the camera which follows a moving object for its focus detection.

Still a further object of the present invention is to provide the focus detecting device for the camera which detects the focus condition of a low brightness and low contrast object.

An additional object of the present invention is to provide an automatic focusing device for a camera which adjusts the focusing rapidly.

According to the present invention, a solid state image sensor receives an image formed thereon through an objective lens of a camera, integrates a charge representing the intensity of light incident thereon, terminates the integration operation when the level of the integrated charge reaches a given value or when a given integration limit time has lapsed and generates an image signal representing the integrated charge which in turn is amplified step-by-step in acccordance with the brightness of the object for the focus condition detection. To this end, two different integration limit times are provided such that the integration operation is terminated at the shorter time while the focus detection is possible within the time. The integration operation is terminated at the longer time limit when the focus condition detection is impossible with the shorter integration limit time and with the image signal given by the integration for the shorter time limit. Accordingly, the effect of the camera shaking on the focus detection, missing of the desired shutter actuation chance and low response to a moving object are less likely to occur because the integration limit time remains at the shorter time in a relatively low brightness.

In one aspect of the invention, a light emission means which emits auxiliary light onto an object is triggered when the focus detection is impossible because of the low brightness and the low contrast of the object. In this case, the light emission increases the brightness and the contrast of the object and enables the focus detection by the auxiliary light emitted onto the object. Accordingly, the focus condition detection against the low brightness and low contrast object can be effected easily.

These and other objects, features and advantages of the invention will become more apparent upon a reading of the following detailed specification and drawing, in which:

DETAILED DESCRIPTION OF PREFERRED EMBODIMENTS

Figure 1:
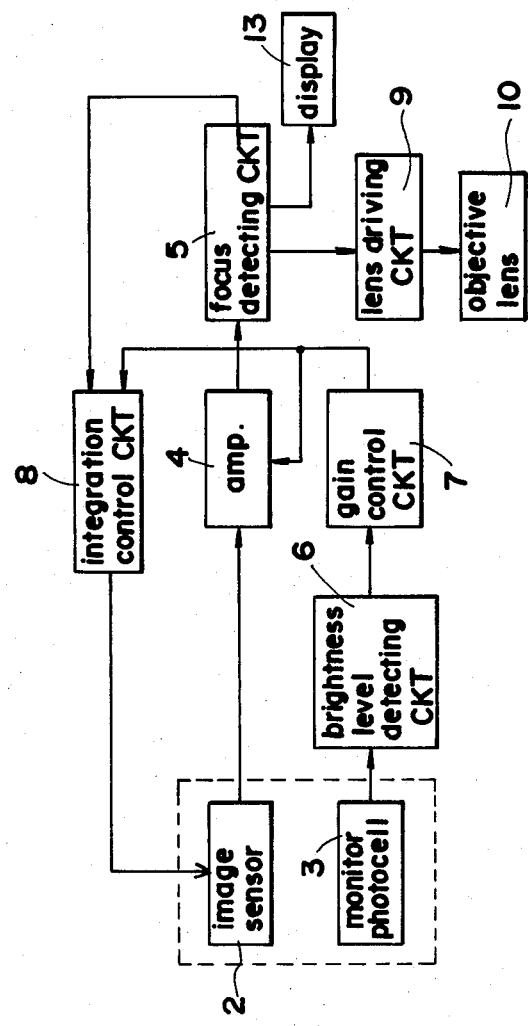
FIG. 1 is a block diagram showing a basic construction of the present invention.

FIG. 1 is a block diagram showing a basic construction of the present invention. With reference to the Figure, a photoelectric converter section 1 comprises a solid state image sensor 2 such as a CCD (Charge Coupled Device) and monitor photocell 3. Image sensor 2 includes a photosensor array with a large number of photocells arranged in a row, and outputs an image signal representative of the brightness distribution of the image formed on the photosensor array. Monitor photocell 3 is disposed in the vicinity of the photosensor array and produces a brightness signal representative of the mean value of the intensities of the lights incident on photocells of the array. An amplifier section 4 amplifies the image signal fed from the image sensor 2 at the rate given by a setting section 7 which will be described later. A focus detecting section 5 detects the focus condition of the objective lens in accordance with the image signal fed from the amplifier section. The focus condition to be detected by the focus detecting section 5 includes the amount and direction of defocus that means how much and in which direction (to the front or rear) the image formed by the objective lens deviates from a predetermined focal plane. The focus detecting section 5 outputs a focus detection unavailable signal when the target object has such a low contrast as to disable the focus detection as in the case of a white plane wall being aimed at. The focus detection unavailable signal represents that is is impossible to detect the focus condition.

A brightness level detecting section 6 detects the level of the output of the monitor photocell 3 and generates a signal in accordance with the detected level. A setting section 7 sets an amplification factor and integration time in accordance with the signal from the brightness level detecting section 6. In response to the signals from the focus detecting section 5 and the setting section 7, an integration time control section 8 terminates the integration of image sensor 2 upon a lapse of a light-dependent integration time in compliance with the illuminance on the photosensor array, upon a lapse of a first limit time TM1 or upon a lapse of a second limit time TM2 which is longer than the first limit time TM1. When the average light intensity level i.e., the illuminance level on the photosensor array is so high that the light dependent integration time determined by the illuminance level is shorter than the first limit time TM1, the integration time control section 8 terminates the integration of the image sensor 2 upon lapse of the light dependent integration time. When the illuminance level is lower than a given value and it is expected that the light dependent integration time is longer than the first limit time TM1, the integration time control section 8 terminates the integration of the image sensor 2 upon lapse of the first limit time TM1. In this case, if the focus detecting section 5 generates a focus detection unavailable signal in accordance with the processing of the image signal from the image sensor 2, by means of the amplifier section 4, the integration time control section 8 terminates the integration in the next integration cycle, upon lapse of the second limited time TM2.

In response to the output from the focus detecting section 5, a lens driving section 9 which includes a motor drives a camera objective lens 10 to its in-focus position. An indicator section 13 also responds to the output from the focus detecting section 5 to display the focus condition in a camera viewfinder.

Figure 2:
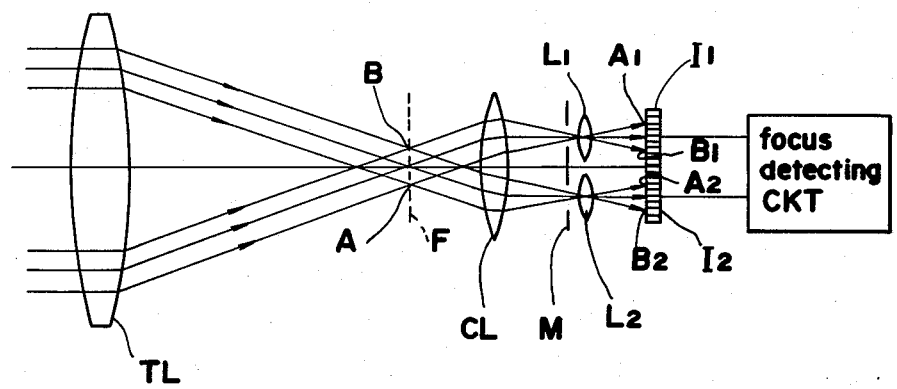
FIG. 2 is a schematic illustrations showing an example of the camera optical system shown in FIG. 1.

FIG. 2 shows an example of the camera optical system for use with the embodiment of the focus control device shown in FIG. 1. The optical system includes a camera objective lens TL, a focal plane F which is optically equivalent to the film plane in the camera, a condenser lens CL, a pair of image forming lenses L1 and L2, a diaphragm M for restricting the light entering the image forming lenses and a pair of charge integration type image sensors I1 and I2 such as CCDs. With the optical system, the images in the areas A and B on the plane F are reformed as images A1 and B1 and A2 and B2 on the image sensors I1 and I2. The image sensors I1 and I2 produces two sets of image signals which represent the light intensity distributions of the images respectively formed on the image sensors I1 and I2. The image signals are supplied to a focus detecting circuit which in turn determines the focus condition i.e., the direction of defocus and the amount of deviation of the primary image in accordance with the relationship between the image signals. It is to be noted that the primary image is the image formed by the camera objective lens TL and is formed at a position spaced from i.e. deviated from the predetermined focal plane F when the objective lens TL is in an out-of-focus condition.

Figure 4:
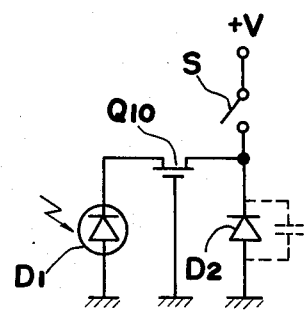
FIG. 4 is a circuit construction of a photoelectric cell shown in FIG. 3.
Figure 3:
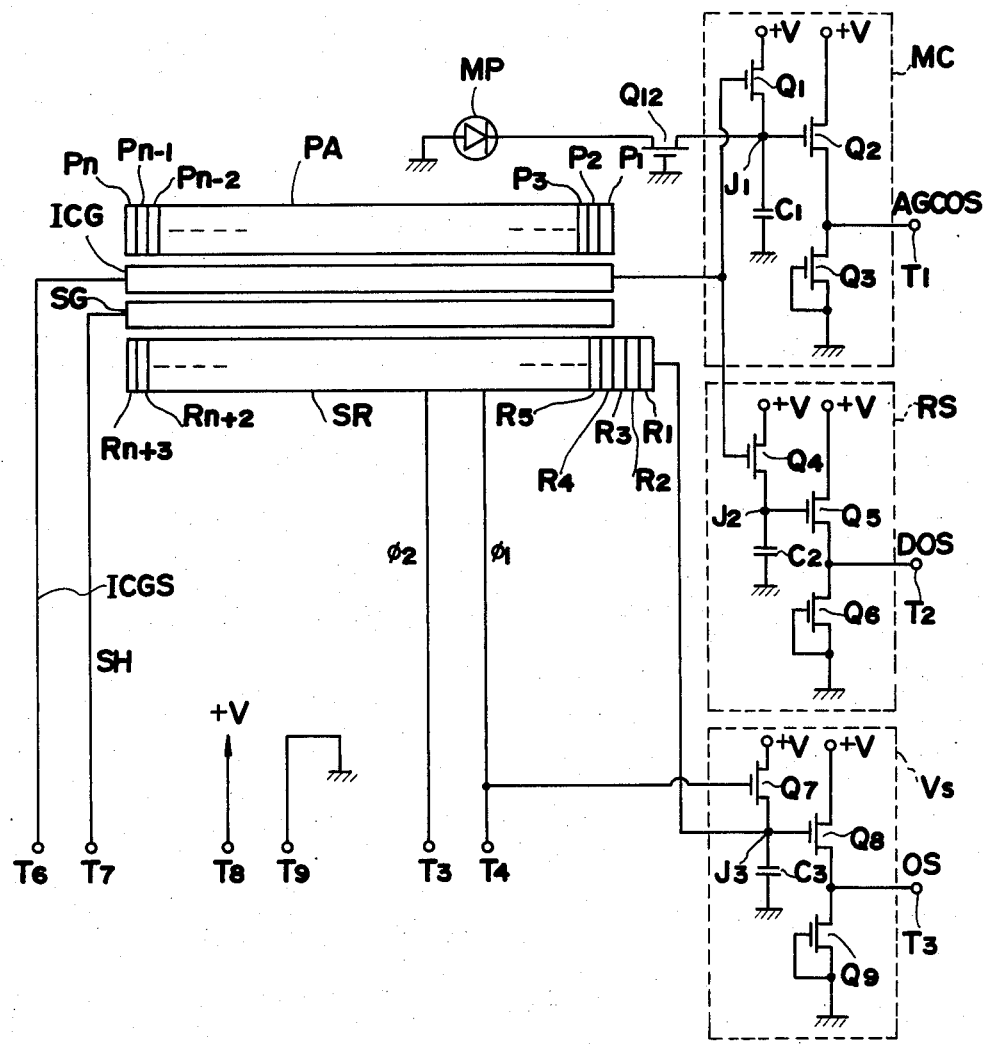
FIG. 3 is a detailed circuit of a photoconverter section 1 shown in FIG. 1.

FIG. 3 shows the photoconverter section 1 in detail. The photoconverter section 1 includes a photosensor array PA composed of photoelectric cells P1, P2, ... P(n−1) and Pn, an integration clear circuit ICG for initializing the photosensor array PA, a shift gate circuit SG for transferring the charges accumulated or integrated in the photosensor array PA, a CCD shift register SR composed of cells R1, R2, ... R(n+2), R(n+3), an illuminance monitoring circuit MC, reference signal generating circuit RS and a video signal producing circuit VS. The CCD shift register SR forms a transfer section which transfers the charges from the photosensor array PA, to the video signal producing circuit VS one by one. The number of the cells of the CCD shift register SR is larger by three than the number of the photoelectric cells in the photosensor array PA. The cells R1, R2 and R3 of the CCD shift register SR are adapted for the transfer of empty signals. The charges accumulated in photoelectric cells P1, P2 ... P(n−1) and Pn of the photosensor array PA are parallelly transferred to the cells R4, R5, ... R(n+2) and R(n+3) of the CCD shift register SR by a shift pulse SH which will be explained later. Each photoelectric cell has a circuit construction as shown in FIG. 4 and is composed of a photodiode D1, charge storing diode D2, an FET Q10 and a switch S. The charge storing diode D2 stores the charge by means of the junction capacitance at the PN junction of the diode D2. The FET Q10 has its base grounded and its drain and source connected between the cathode of the photodiode D1 and the cathode of the charge storing diode D2. The switch S is serially connected to the power source +V and the cathode of the charge storing diode D2. The semiconductor switching element of the integration clear circuit ICG serves as the switch S. When the switch S is closed, i.e., when the semiconductor switching element turns on in response to an integration clear signal ICGS, the voltage level on the cathode side of the charge storing diode D2 is lifted or raised to the level of the power source voltage +V. Accordingly, the signal level of the photosensor is set to an initial condition. When the switch S is opened, i.e., when the semiconductor switching element turns off after the disappearance of the integration clear signal ICGS, the photoelectric current of the photodiode D1 discharges the charge stored in the charge storing diode A2, through FET Q10 so that the cathode potential of the charge storing diode D2 decreases as the time proceeds. In other words, the photoelectric current is integrated in the manner that negative charge is accumulated in the charge storing diode D2 at a rate in compliance with the intensity of the light incident on the photodiode D1. Accordingly, each photoelectric cell accumulates charge at a rate in compliance with the incident light intensity. The accumulation of the charge by the photoelectric cells commences upon disappearance of the integration clear signal ICGS and terminates upon application of a shift pulse SH to the shift gate circuit SG. The application of the shift pulse causes the transfer of the charges in the photoelectric cells to the CCD shift register SR, which in turn successively outputs the transferred charges one by one in synchronization with transfer pulses $\phi_1$ and $\phi_2$ to the video signal producing circuit VS.

The terminals T8 and T9 serve to apply the power source voltage +V and the ground potential respectively to the photosensor array PA, the illuminance monitoring circuit MC, the reference signal generating circuit RS and video signal producing circuit VS. The illuminance monitoring photocell MP is located in the vicinity of the photosensor array PA. The illuminance monitoring circuit MC is composed of FETs Q1, Q2 and Q3 and capacitor C1. FET Q1 has its gate connected to the output of the integration clear circuit ICG and is rendered conductive by the aforementioned integration clear signal ICGS to raise the potential at the junction $J_1$ between the gate of FET Q2 and the capacitor C1 to the level of the power source +V. The illuminance monitoring photocell MP operates in the same manner as the photoelectric cells in the photosensor array PA. That is, in response to the disappearance of the integration clear signal ICGS, the capacitor C1 which has been charged to the power source level +V begins to accumulate negative charge at a rate in compliance with the intensity of the light incident on the illuminance monitoring photocell MP. The FETs Q2 and Q3 constitute a buffer circuit which produces, at the terminal T1 derived from the junction between the FETs Q2 and Q3, a voltage AGCOS which is equal to the voltage at the junction J1.

Figure 5:
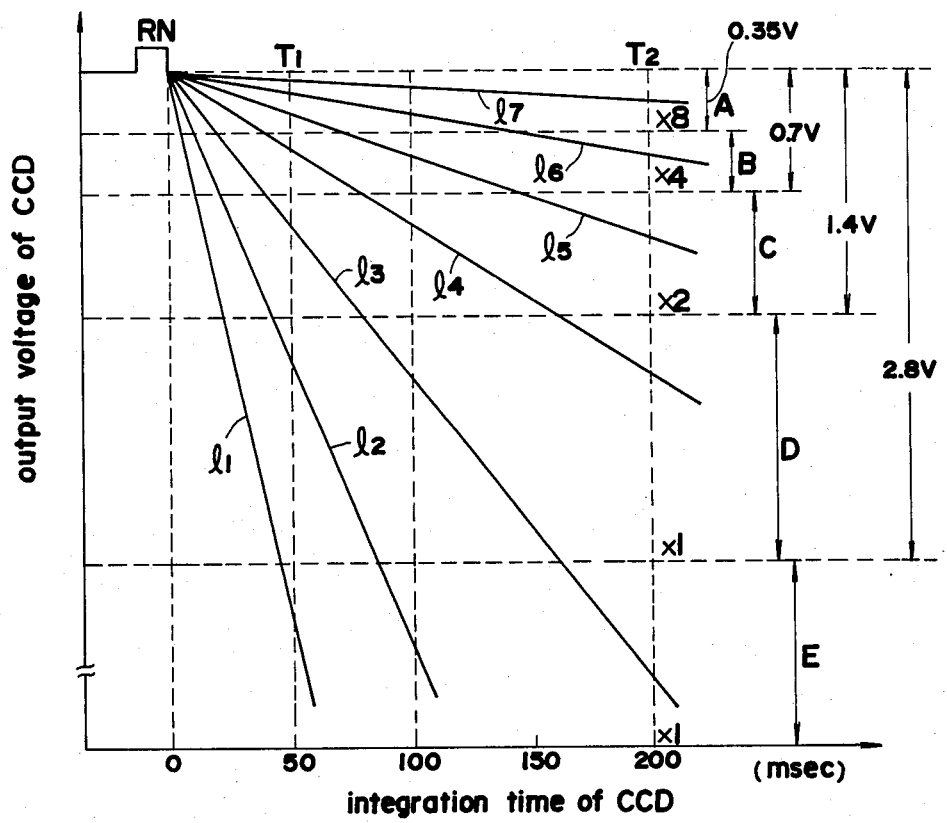
FIG. 5 is a timing chart showing the change of the output voltage AGCOS shown in FIG. 3 with time.

FIG. 5 shows the change of the output voltage AGCOS with time. The rate of the change varies in accordance with the illuminance on the photocell MP as shown by lines 11 through 17. The rising wave form RN shows a pulse induced within the CCD by the integration clear signal ICGS.

Returning to FIG. 3, the reference voltage generating circuit RS is composed of FETs Q4, Q5 and Q6 and a capacitor C2. The junction J2 between the FET Q4 and the capacitor C2 is connected to a buffer circuit composed of the FETs Q5 and Q6 and having the same construction as that of the buffer circuit in the illuminance monitoring circuit MC. As those buffer circuits are formed in the same integrated circuit, their constructions and characteristics are the same with each other. Accordingly, the reference voltage DOS at the terminal T2 immediately after the disappearance of the integration clear signal ICGS is approximately equal to the voltage AGCOS at the terminal T1 of the illuminance monitoring circuit MC. Hence, the voltage at the terminal T2 can be used as a reference voltage for measuring the voltage that decreases as the time proceeds The video signal producing circuit VS is composed of FETs Q7, Q8, and Q9 and a capacitor C3. The junction $J_3$ between the FET Q7 and the capacitor C3 is connected to a buffer circuit composed of FETs Q8 and Q9 and to the output terminal of the CCD shift register SR. The gate of the FET Q7 is connected to the terminal T4 adapted for transmitting the transfer pulse $\phi_1$. When the transfer pulse $\phi_1$ is applied, the FET Q7 is rendered conductive to charge the capacitor C3 to the power source level +V and reset the video signal producing circuit VS. After that, the capacitor C3 discharges. the charges depending on the charge transferred from the CCD shift register SR. Thus, the capacitor C3 repeats the charging and discharging in response to application of each transfer pulse $\phi_1$ so that voltage corresponding to the charges in the photoelectric cells are output, as the image signal for each picture element, from the terminal T3 derived from the junction between the FETs Q8 and Q9. The voltages together form a video signal as a whole.

Figure 6:
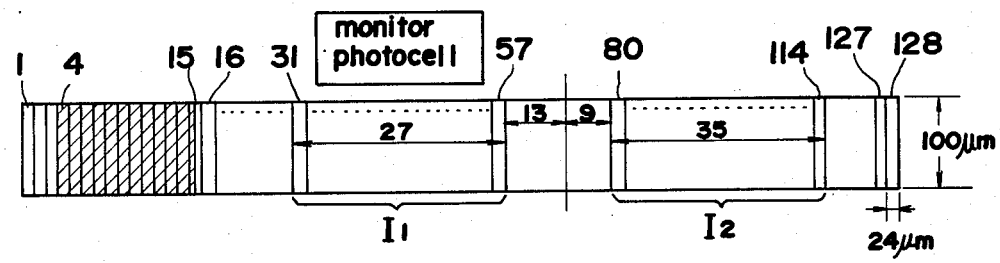
FIG. 6 is a map showing the construction of a CCD shift register shown in FIG. 3.

FIG. 6 shows a map showing the functional allotment for each cell in the CCD shift register SR. The cells are from number 1 to 128 wherein 27 cells from number 31 to 57 correspond to the image sensor I1 shown in FIG. 2, and 35 cells from number 80 to 114 correspond to the image sensor I2 shown in the same Figure. The reason why the number of cells corresponding to the image sensor I2 is larger than that of the cells corresponding to the image sensor I1 is as follows. The outputs of the 27 cells corresponding to the image sensor I1 are at first compared with the outputs of 27 cells from number 80 to 106 corresponding to the image sensor I2, then compared with the outputs of 27 cells from number 81 to 107, and the comparison is repeated until the outputs of the 27 cells from number 31 to 57 corresponding to the image sensor I1 are compared with the outputs of 27 cells from number 88 to 114 with the numbers of the cells corresponding to the image sensor I2 being shifted by one. The focus condition, i.e., in-focus, front focus or rear focus is determined by calculating the correlations of the results of the comparisons. The cells from number 1 to 3 are dummy cells for the transmission of empty signals and the cells from number 4 to 14 and the half portion of the number 15 cell are masked with evaporated aluminium layer to perfectly prevent the entrance of light to those cells. The evaporated aluminium layer slightly affect the electric characteristics of the CCD shift register SR.

Figure 7:
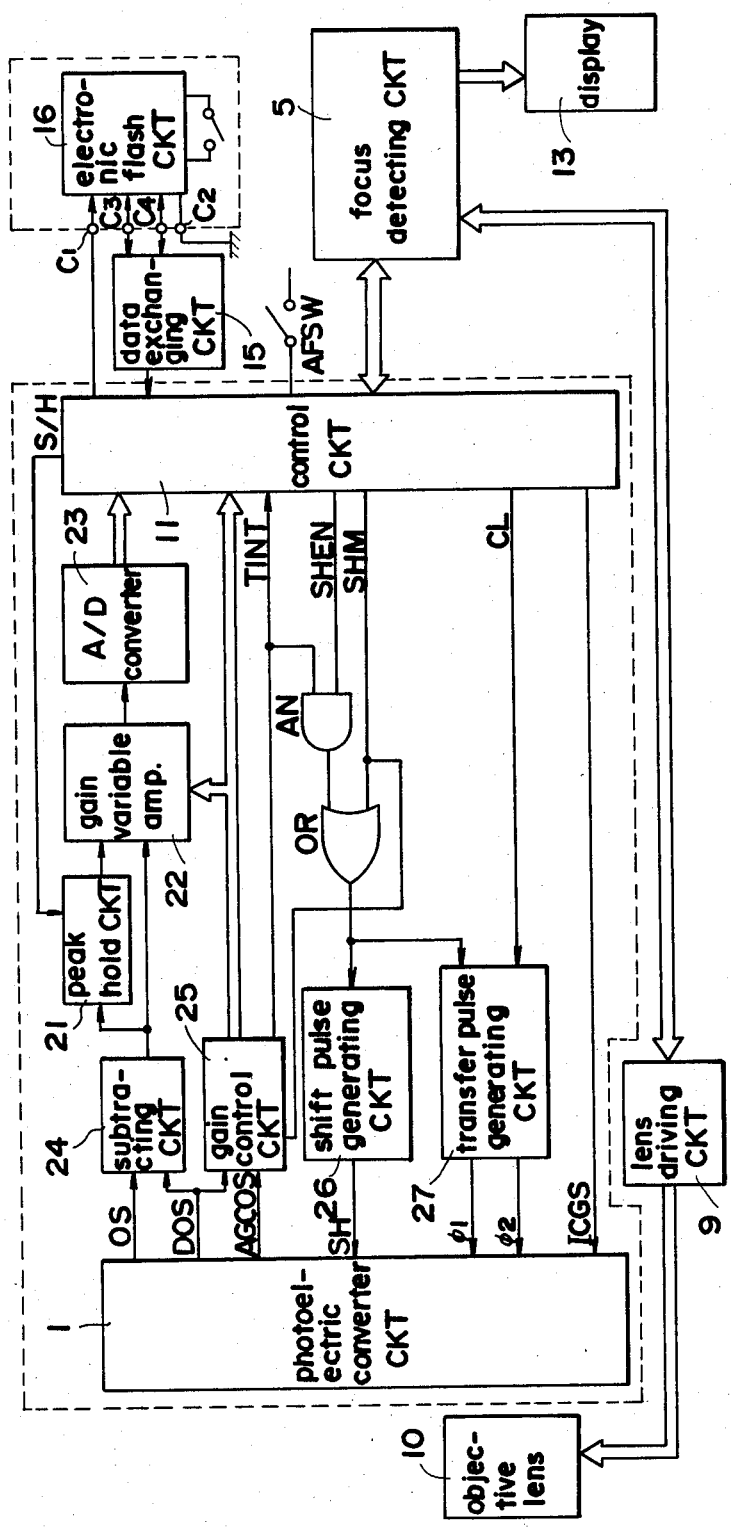
FIG. 7 is an exemplary circuit construction of the embodiment shown in FIG. 1.

FIG. 7 shows an exemplary circuit construction of the embodiment shown in FIG. 1. In the circuit construction, a control circuit 11 and the focus detecting circuit 5 are composed of a microcomputer. An automatic focusing (hereinafter referred to as AF) switch AFSW is closed when a camera shutter release button is depressed down for a first stroke or to a first stage. Detecting the closure of the AF switch AFSW, the control circuit 11 commences the control of the focus detection. First, the control circuit 11 supplies an integration clear signal ICGS to the photoconverter circuit 1 to reset the photoelectric cells to their initial conditions and restore the output AGCOS of the illuminance monitoring circuit MC to the power source voltage level. At the same time, the control circuit 11 generates a logic "High" level shift pulse enabling signal SHEN. Upon disappearance of the integration clear signal ICGS, each photoelectric cell in the photoconverter circuit 1 starts the integration of light intensity incident thereon and the illuminance monitoring circuit MC starts the measurement of the target object to be photographed. At the same time, the output AGCOS of the monitoring circuit MC decreases at a rate in compliance with the object brightness, i.e., the illuminance on the photocell of the monitoring circuit.

A gain control circuit 25 is supplied, as its inputs, with the reference voltage DOS output from the reference voltage generating circuit RS and the output voltage AGCOS of the illuminance monitoring circuit MC to produce reference voltages of four steps within the gain control circuit 25 itself on the basis of the reference voltage DOS and compares the monitored brightness signal AGCOS with the four step reference voltages, thereby determining the gain. When the output AGCOS of the illuminance monitoring circuit MC decreases at such a high rate to become lower than a given voltage within a given period TM1, e.g., 50 msec from the disappearance of the integration clear signal ICGS, the gain control circuit 25 generates a logic "High" level TINT signal which is supplied to the control circuit 11 and AND gate AN. The AND gate AN which is also receiving the shift pulse enabling signal SHEN outputs a logic "High" level signal, which is applied through OR gate OR to a shift pulse generating circuit 26 which in turn applies a shift pulse SH to the photoconverter circuit 1 in response to the "High" level signal. The shift pulse SH terminates the integration of each photoelectric cell in the photoconverter circuit 1 and causes the accumulated charges to be parallelly transferred to corresponding cells of the CCD shift register SR.

From the time when the AF switch AFSW turned on, the control circuit 11 supplies clock pulses CL to a transfer pulse generating circuit 27, which generates, on the basis of the clock pulses, transfer pulses $\phi 1$ and $\phi 2$ that delay or proceed in phase by 180° from each other. When the output of the OR gate OR turns to a "High" level, the transfer pulse generating circuit 27 generates a transfer pulse $\phi 1$ which rises in synchronization with the rising of the output of the OR gate OR. It should be noted that the transfer pulse $\phi 1$ is synchronized with the shift pulse SH by the following reason. Although very low, the CCD shift register SR has a sensitivity to light and senses light so that, in the case where the shift pulse SH is not synchronized with the transfer pulse $\phi 1$, a charge commensurate with the sensed light intensity is stored as a false signal for the time while the shift pulse SH and the transfer pulse $\phi 1$ is not in synchronization. To cope with this, the transfer pulse $\phi 1$ is synchronized with the shift pulse SH to eliminate the time gap and prevent the generation of the false signal. After the generation of the transfer pulse $\phi 1$, the transfer pulse generating circuit 27 supplies the transfer pulses $\phi 1$ and $\phi 2$ to the photoconverter circuit 1. In the photoconverter circuit 1, in synchronization with the falling of the transfer pulse $\phi 1$, the charges stored in the CCD shift register SR are output from the end cell (the cell of number 1 in FIG. 6) sequentially one by one as the image signals and are supplied to a subtracting circuit 24. The subtracting circuit 24 is applied in its inputs with the reference voltage DOS and the image signal OS. The image signal has a low voltage as the intensity of the light incident on the corresponding photoelectric cell is higher, and the resultant voltage (DOS-OS) of the subtraction of the image signal OS from the reference voltage DOS is output as the picture element signal.

In the case where the output voltage AGCOS of the illuminance monitoring circuit MC does not become lower than the given level and the gain control circuit 25 does not output the TINT signal within the limited integration time TM1, e.g., 50 msec from the disappearance of the integration clear signal ICGS, the control circuit 11 supplies a shift pulse generation commanding signal SHM through OR gate OR to the shift pulse generating circuit 26 which in turn responds to the commanding signal SHM and applies a shift pulse SH to the photoconverter circuit 1, causing the charges accumulated in the photosensor array PA to be transferred to the CCD shift register SR. Then, the transfer pulses $\phi 1$ and $\phi 2$ cause the video signal producing circuit VS to generate image signals OS which are processed by the subtracting circuit 24 which in turn generates the voltage of (DOS-OS) in the same manner as in the case described before.

A peak hold circuit 21 receives a sample hold signal S/H fed from the control circuit 11 when the subtracting circuit 24 generates picture element signals (DOS- OS) corresponding to the outputs of the aluminum-layer-masked photoelectric cells from number 7 to 10 of the CCD shift register SR. In response to the sample hold signal S/H, the peak hold circuit 24 holds the picture element signals as mentioned just above. Those sample-held picture element signals are fed to a gain variable amplifier circuit 22 which effects the subtraction between the sample-held picture element signals and the picture element signals for the cells of the number larger than 10 that are supplied from the subtracting circuit 24. The voltages as the results of the subtractions are amplified with the gain controlled by the gain control circuit 25. The amplified voltage is converted from the analog to digital signals by an A/D converter 23 and supplied through the control circuit 11 to the focus detecting circuit 5 as picture element signal data. At the same time, the gain control data obtained by the gain control circuit 25 is supplied through the control circuit 11 to the focus detecting circuit 5 which performs calculation operation with those two kinds of data supplied thereto.

When the result of the calculation operation indicates the capability of focus detection, the focus detecting circuit 5 calculates the amount of deviation of the primary image from the predetermined focal plane. The focus detecting circuit 5 also calculates the amount of lens driving that corresponds to the amount of the image deviation, on the basis of the above mentioned picture element signal data and the data of the amount of lens driving is applied to a lens driving device 9, which drives the camera objective lens 10 by an amount given by the lens driving amount data. Then, the sequence from the generation of the integration clear signal ICGS by the control circuit 11 to the driving of the camera objective lens 10 is repeated until the objective lens 10 reaches an in-focus position.

When the result of the calculation operation for the focus detection indicates incapability of focus detection, the indicating circuit 13 indicates that the focus condition can not be detected. In the case the result of the focus detecting operation indicates that the brightness of the target object is too low (Lo-Light) for the focus detection to be effected, the control circuit 11 commands and effects the focus detection with an auxiliary light if the auxiliary light is ready for use. If the auxiliary light is not ready, the focus detection without the auxiliary light is effected again but with a longer integration time. If incapability of focus detection is judged in the long integration time focus detection, the indicating circuit 13 indicates the incapability of focus detection. If capability of focus detection is judged in the long integration time focus detection, the calculation operation and the objective lens driving are repeated until an in-focus condition is attained. In the case of the focus detection with the auxiliary light, when a signal indicating the attainment of the ready condition of the auxiliary light is transmitted from an electronic flash circuit 16 through terminals C3 and C4 and a data exchanging circuit 15 in the camera to the control circuit 11, the control circuit 11 supplies on auxiliary light emitting signal for commanding the emission of the auxiliary light, through terminal C1 to the electronic flash circuit 16, which in turn is energized to emit the auxiliary light with which the focus detection is effected.

Figure 8:
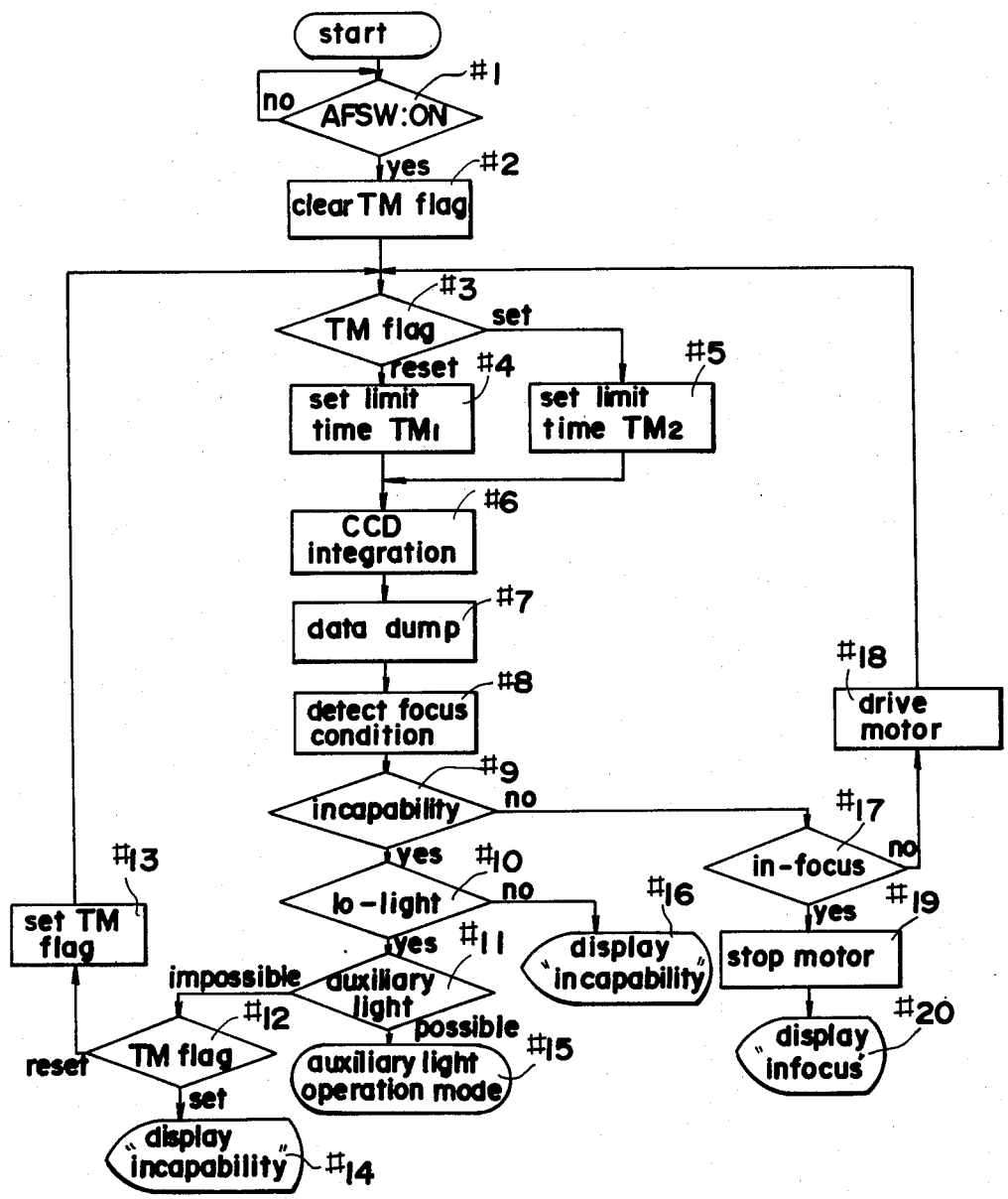
FIG. 8 is a flow chart showing the flow of the operations of a control circuit 11 and focus detecting 5 shown in FIG. 7.

FIG. 8 is a flow-chart showing the flow of the operations of the control circuit 11 and the focus detecting circuit 5. In the Figure, TM1 and TM2 represent the limit times required for the accumulation of electric charge in the CCD as a kind of solid-state image sensing device (the time is hereinafter referred as integration limit time) and the integration limit times are in the relationship of TM1<TM2. When a power source switch (not shown) is turned on, the camera circuit is supplied with the power of the source. Then, the flow shown in FIG. 8 is started, and at step #1, the control circuit 11 waits for the turning-on of the AF switch AFSW. When the AF switch AFSW is turned on, the flow proceeds to step #2 where the control circuit 11 clears the TM flag. The TM flag is used for the setting of the integration limit time for the CCD. When the TM flag is cleared, the control circuit 11 sets the integration limit time to a shorter time TM1. At step #3, the control circuit 11 judges whether the TM flag has been set or not. In this case, as the flow has proceeded from step #2 to step #3 and TM flag has been cleared, the control circuit 11 sets the integration limit time for the CCD to TM1 at step #4. The control circuit 11 causes the CCD to accumulate, i.e., integrate charges at step #6 and then to output successively the integrate charges of the CCD as the image signals at step #7. The image signals OS are subtracted respectively from the reference signal DOS by the subtracting circuit 24 to be picture element signals which are amplified with the gain in compliance with the brightness of the target object and converted from the analog signals to digital signals by the A/D converter circuit 23. Receiving the data of the A/D converted picture element signals and the data of the gain through the control circuit 11, the focus detecting circuit 5 performs the calculation operation for the focus detection at step #8.

At step #9, the focus detecting circuit 5 judges in accordance with the result of the calculation operation, whether the focus detection can be done or not. If the focus detection is possible, the focus detecting circuit 5 calculates the amount of the image deviation and the amount of lens driving. If the incapability of focus detection is detected at step #9, the flow proceeds to step #10 while the flow jumps to step #17 when incapability of focus detection is not detected. At step #17, it is detected whether the result of the calculation operation at step #8 for the focus detection indicates in-focus condition or not. If the in-focus condition is indicated, the motor of the lens driving device 9 is stopped at step #19 and indication of the in-focus condition is made at step #20. On the other hand, when out-of-focus condition is indicated, the flow proceeds to step #18 where the motor is driven in accordance with the amount of lens driving which corresponds to the amount of image deviation calculated at step #8. Then the operation returns to the flow beginning from step #3 and the sequential operation is repeated until in-focus condition is detected at step #17.

When incapability of focus detection is determined at step 9, it is judged at step #10 whether the focus detection can not be effected because of low brightness (Lo-LIGHT) of the target object. When the focus detection at step #10 can not be effected not because of the low brightness (LO-LIGHT) but because of low contrast, the time taken at step #6 for the actual integration is within the integration limit time set at that time, or the gain obtained at step #8 is smaller than the predetermined value. In this case, the incapability of focus detection due to the low contrast is indicated at step #16. When the cause of the incapability of focus detection is the low brightness, the time taken for the actual integration at step #6 is equal to the integration limit time set at that time, and the gain obtained at step #7 is larger than a predetermined value. Then, it is judged at step #11 whether focus detection with the aid of the auxiliary light is possible or not. If the auxiliary light focus detection is possible, the flow jumps to step #15 from which the auxiliary light focus detection mode routine is effected and focus condition is detected with the auxiliary light being emitted for the low object brightness.

If the auxiliary light focus detection is impossible, the TM flag is judged at step #12. The TM flag is used for setting the CCD integration limit time to the longer time TM2 when the flag is set to "1". In the present flow, TM flag has been limit cleared at step #2 to set TM1 as the integration limit time, that flow proceeds to step #13 where the TM flag is set to "1" and the flow returns to step #3. As the TM flag was set at step #13, the flow then proceeds to step #5 and longer integration limit time TM2 is set. Then, in the same manner as in the case when the integration limit time TM1 is set, the operations from the accumulation of charges in the CCD to the calculation for the focus detection are performed. If the longer integration limit time TM2 enables the focus detection, the operation proceeds to the flow from step #9 to step #17 and the same routine as in the aforementioned case when the focus detection is possible with the shorter integration limit time TM1, is repeated with the longer integration limit time TM2 until an in-focus condition is attained. If focus detection is impossible even with the longer integration limit time TM2 and the auxiliary light focus detection is also impossible with the TM flag being set, the incapability focus detection is indicated at step #14. This indication is made in accordance with the judgment that although the CCD integration limit time was made longer to cope with the low object brightness, enough information for the focus detection and focusing will not be obtained because the auxiliary light is unavailable.

Figure 9:
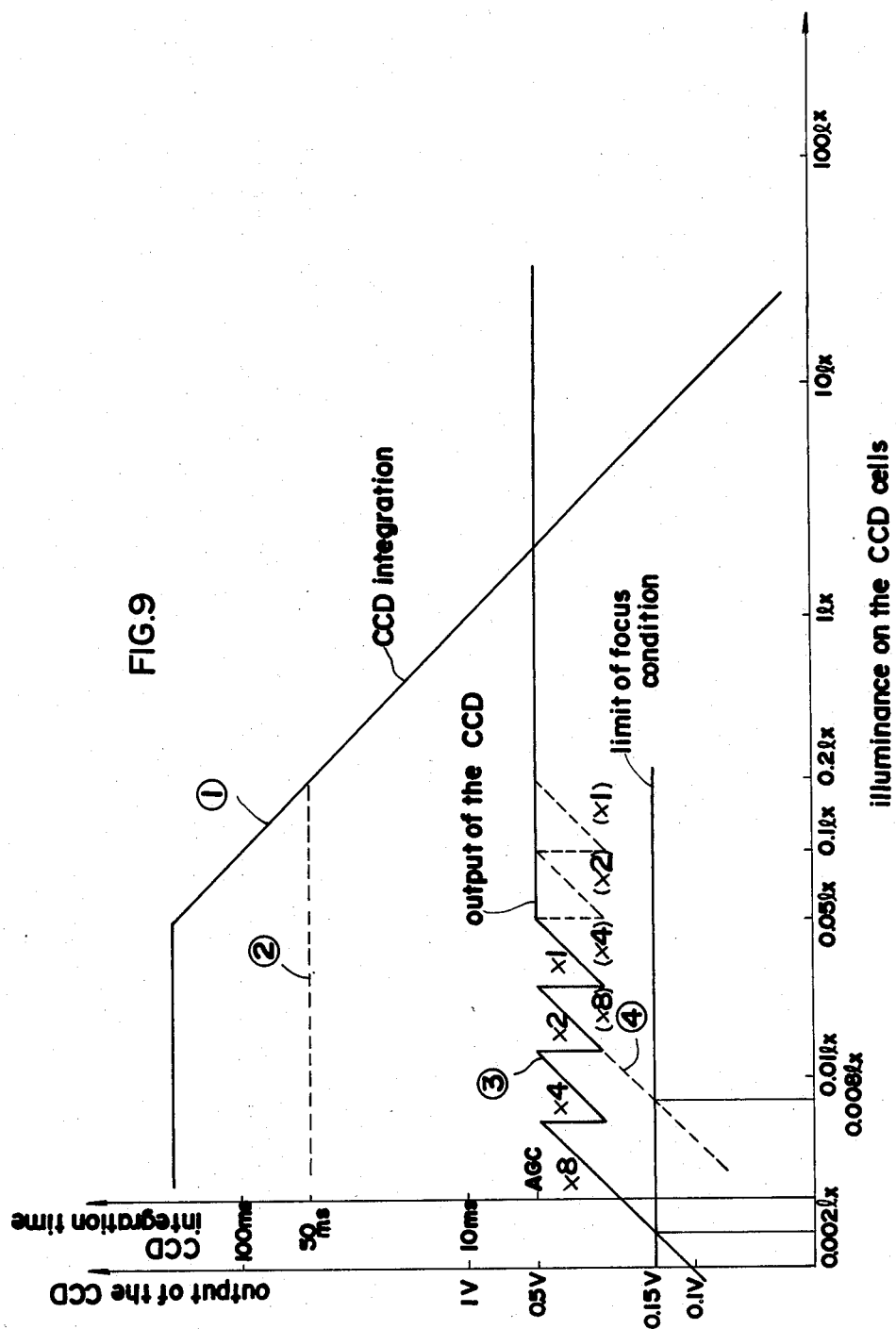
FIG. 9 is a graph showing the relationship between the amplified CCD outputs and the integration limit time for the CCD.

FIG. 9 is as logarithmic graph showing the relationship between the amplified CCD outputs and the differently set integration limit time (TM1=50 msec, TM2=200 msec) for the CCD. In the Figure, the abscissa shows the illuminance on the CCD cells that depends on the object brightness, while the ordinate shows the CCD integration time and the output of the CCD which has been amplified by the variable gain amplifier circuit 22 shown in FIG. 7. The gain of the amplifier circuit 22 is selected to X1, X2, X4 and X8 by the gain control circuit 25 which receives from the brightness monitor circuit MC a signal commensurate with the object brightness. The lines (1) and (3) in the graph respectively show the integration time and the amplified outputs of the CCD in the case where the CCD integration limit time is set to 200 msec. In the case when the illuminance on the CCD cells is higher than 0.05 lux, the CCD integration time shown by the line (1) becomes shorter as the illuminance on the CCD cells increases, such that the output of CCD shown by the line (3) is fixed to 500 mV. When the illuminance is lower than 0.05 lux, the CCD integration time is fixed to 200 msec. In this case, the gain controlled by the gain control circuit 25 changes stepwisely to X1, X2, X4 and X8 which are respectively multiplied to the output of CCD with the amplified outputs of the CCD being in sawtooth form. An amplified output of CCD will decrease with the decrease of the illuminance on the CCD cells after the gain of X8 has been selected. The lines (2) and (4) respectively show the integration time and the amplified outputs of the CCD in the case where the integration limit time for the CCD is set to 50 msec. As indicated by the line (2), the integration time is fixed to 50 msec while the illuminance on the CCD cells is lower than 0.2 lux, and becomes shorter as the illuminance increases when the illuminance is higher than 0.2 lux. When the illuminance is higher than 0.2 lux, the output of the CCD shown by line (4) is fixed to 500 mV. When the illuminance is lower than 0.2 lux, the gain controlled by the gain control circuit 25 changes stepwisely to X1, X2, X4 and X8 which are respectively multiplied to the output of the CCD. The limit of focus detection generally depends on the output value of the CCD and focus detection is possible for a standard object if the output of CCD is more than 0.15 V. Hence, while the illuminance on the CCD cells is in a range from 0.2 lux to 0.008 lux, focus detection is possible with the integration limit time for the CCD being set 50 msec if the gain is changed to make the output of CCD larger than 0.15 V. In this case, the integration time is shorter than 200 msec so that the cycle of the focus detection is short and the focus detection can follow a moving object with good responsibility.

Table 1 shows the relationship between the integration time and the gain which relationship is attained by the embodiment described above.

TABLE 1

| Illuminance | TM1 = 50 msec, Integration time | TM2 = 200 msec Gain |
|---|---|---|
| more than 0.2 lx | within 50 msec | X1 |
| 0.2–0.1 lx | 50 msec | X1 |
| 0.1–0.05 lx | 50 msec | X2 |
| 0.05–0.025 lx | 50 msec | X4 |
| 0.025–0.0125 lx | 50 msec | X8 |
| 0.0125–0.008 lx | 50 msec | X8 |
| 0.008–0.0063 lx | 200 msec | X4 |
| 0.0063–0.002 lx | 200 msec | X8 |

The above mentioned gain is determined by the gain control circuit 25 which is supplied with the output voltage AGCOS of the brightness monitor circuit MC shown in FIG. 3. Returning back to FIG. 5 which shows the change of the output voltage AGCOS of the brightness monitor circuit MC with time, the abscissa shows the integration time and the ordinate shows the voltage as the voltage drop from the reference voltage and which voltage is divided into five zones A, B, C, D and E. The zone A is the zone of the voltage drop lower than 0.35 V, zone B is the zone of the voltage drop not lower than 0.35 V and lower than 0.7 V, zone C is the zone of the voltage drop not lower than 0.7 V and lower than 1.4 V, zone D is the zone of the voltage drop not lower than 1.4 V and lower than 2.8 V and zone E is the zone of the voltage drop not lower than 2.8 V. The gain is determined in accordance with the zone, one of the zones A through E within which the monitored brightness representing voltage AGCOS falls after the lapse of the integration limit time TM1 or TM2. In the case the integration limit time is set to TM1 (50 msec), if the voltage AGCOS enters the zone E within the limit time TM1 (50 msec), the integration is stopped immediately and the gain is X1. If the voltage AGCOS is within the xone D after the lapse of the limit time TM1 (50 msec), the gain will be X1. In the same way, if the voltage AGCOS is within zone C, the gain will be X2. If the voltage AGCOS is within zone B, the gain will be X4. If the voltage AGCOS is within zone A, the gain will be X8. Let's see the cases wherein the voltage AGCOS changes as shown by lines 11 through 17 in FIG. 5. For the case of line 11, the integration of charge is terminated within the limit time TM1 (50 msec). For the case of line 12, the gain will be X1 and for the line 13, the gain will be X2. For the line 14, the gain will be X4 and the gain of X8 is selected for the cases of lines 15 through 17. When it is determined that the focus detection is impossible and the object brightness is too low with the integration limit time being set to TM1 (50 msec), i.e., when the gain is not less than X4 after the lapse of the integration limit time TM1 in the case of the present embodiment, the integration limit time is changed to TM2 (200 msec) and the gain is selected again in accordance with the zone within which the monitored brightness representing voltage AGCOS falls after the lapse of the integration limit time TM2 (200 msec). When the voltage AGCOS is within the zone D, the gain will be X1. When the voltage AGCOS is within the zone C, the gain will be X2. When the voltage AGCOS is within the zone B, the gain will be X4. When the voltage AGCOS is within the zone A, the gain of X8 will be selected.

Figure 10:
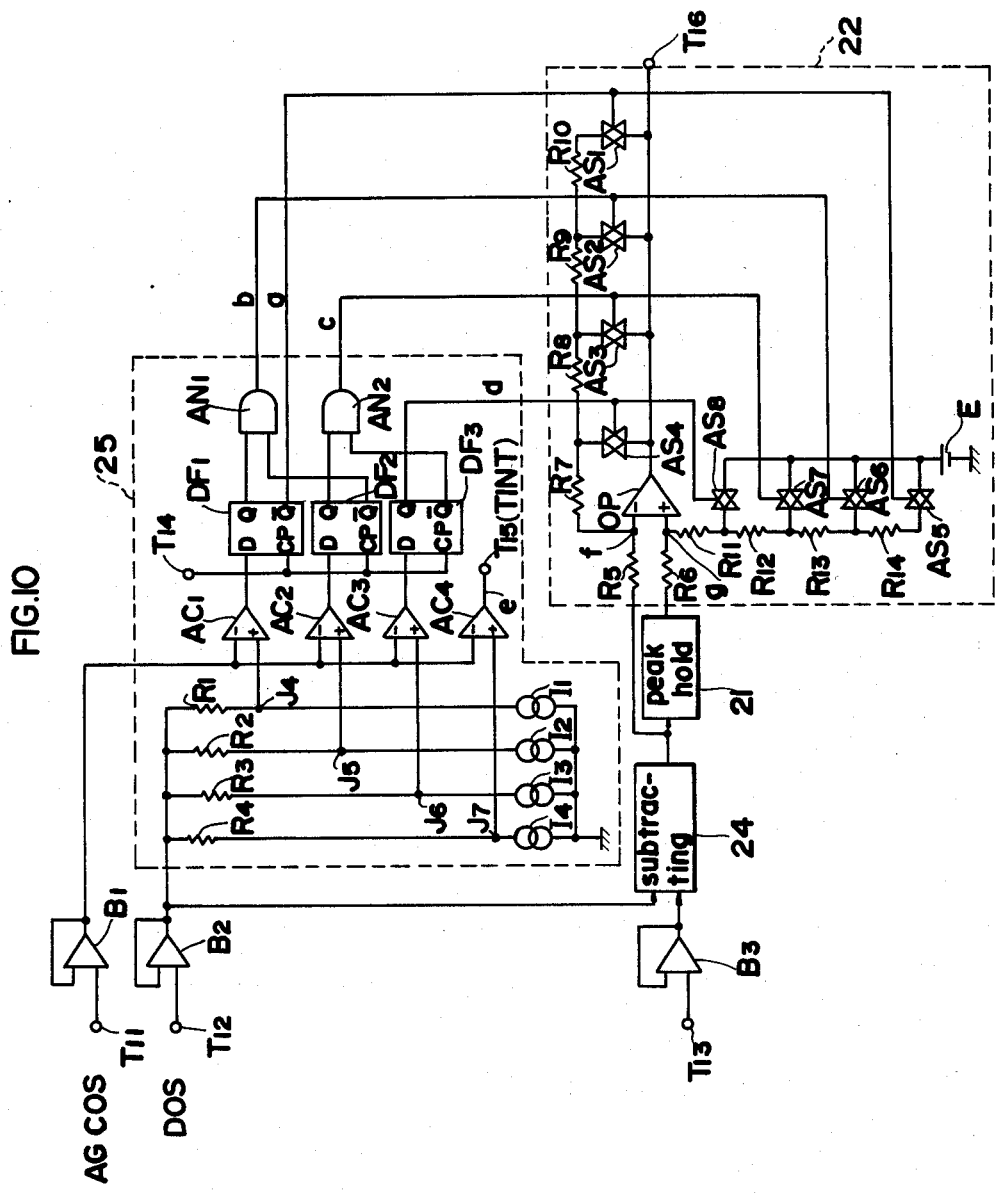
FIG. 10 is a detailed circuit construction of a gain control circuit 25 and variable gain amplifier circuit 22 shown in FIG. 7.

FIG. 10 shows an exemplary definite circuit of the gain control circuit 25 and variable gain amplifier circuit 22 shown in FIG. 7. Terminals T11, T12 and T13 are adapted to be respectively connectable with terminals T1, T2 and T3 shown in FIG. 3. An input terminal T14 receives a shift pulse generation command signal SHM which is generated by the control circuit 11 after a lapse of the set integration limit time TM1 (50 msec) or TM2 (200 msec). From an output terminal T15, a TINT signal is generated when the monitored brightness representing signal AGCOS enters the zone E as shown in FIG. 5, within the integration limit time. From an output terminal T16 is output the picture element signals which have been amplified by the variable gain amplifier circuit 22. The amplified picture element signals are applied through the output terminal to the A/D converter circuit 23. The terminals T11, T12 and T13 are connected to the gain control circuit 25 and the subtracting circuit 24 respectively through buffers B1, B2 and B3. The subtracting circuit 24 subtracts the image signals OS in the form of voltage from the reference voltage DOS. The peak hold circuit 21 holds the dark output compensation data for the compensation for the error in the output due to the dark current of the photoelectric cells.

At first, the gain control circuit 25 is explained. Comparators AC1, AC2, AC3 and AC4 are provided for stepwisely discriminating the degree of the drop of the output voltage AGCOS of the brightness monitor circuit MC after the disappearance of the integration clear signal ICGS. The inverting input terminal of each comparator is connected through buffer B1 to the terminal T11 which receives the output voltage AGCOS of the brightness monitor circuit MC. The non-inverting input terminal of the comparators AC1, AC2, AC3 and AC4 are respectively connected to the junction J4 between a resistor R1 and a constant current source I1, the junction J5 between a resistor R2 and a constant current source I2, the junction J6 between a resistor R3 and a constant current source I3, and the junction J7 between a resistor R4 and a constant current source I4. The resistors R1, R2, R3 and R4 are connected through the buffer B2 to the terminal T12 which receives the output voltage DOS. The reference voltages for the comparators are obtained by subtracting from the output voltage DOS of the reference voltage generating circuit RS, a voltage given by the multiplication of the resistance value of the resistors and the values of the constant currents. Hence, desired reference voltages may be obtained for the comparators if the appropriate values are selected for the resistance and the constant current. Thus, if the reference voltages are determined stepwisely for the comparators, the comparators can be inverted stepwisely in accordance with the degree of the drop of the voltage AGCOS of the brightness monitor circuit MC. The output terminals of the comparators AC1, AC2, and AC3 are respectively connected to the data terminals D of D-flip-flops DF1, DF2 and DF3. The shift pulse generation command signal SHM of the control circuit 11 is applied to the input terminal CP of each D-flip-flop adapted for receiving clock pulses which determine the timing for taking in the data of the D-flip-flop. In more detail, after the lapse of the integration limit time TM1 (50 msec) or TM2 (200 msec), the command signal SHM is applied to the input terminals CP so that the output signals of the comparators AC1, AC2 and AC3 are taken in at the timing of the command signal application. The output signal e of the comparator AC4 is the TINT signal which is produced when the voltage AGCOS of the brightness monitor circuit MC enters the zone E of FIG. 5 within the integration limit time TM1 (50 msec). AND gate AN1 receives at its input terminals the Q output of the D-flip-flop DF1 and the $\bar{Q}$ output of the D-flip-flop DF2. AND gate AN2 receives at its input terminals the Q output of the D-flip-flop DF2 and the $\bar{Q}$ output of the D-flip-flop DF3. AND gates AN1 and AN2 respectively generate output signals b and c. If it is assumed that a signal a is the $\bar{Q}$ output of the D-flip-flop DF1 and that a signal d is the Q output of the D-flip-flop DF3, those signals a, b, c and d and the TINT signal e respectively correspond to the zone A, B, C, D and E in FIG. 5 with respect to the same alphabet. The states of those signals are shown in the following table 2:

TABLE 2

| Zone | Signal | | | | |
| --- | --- | --- | --- | --- | --- |
| | a | b | c | d | e |
| A | 1 | 0 | 0 | 0 | 0 |
| B | 0 | 1 | 0 | 0 | 0 |
| C | 0 | 0 | 1 | 0 | 0 |
| D | 0 | 0 | 0 | 1 | 0 |
| E | 0 | 0 | 0 | 1 | 1 |

Of those signals, the signals a, b, c and d are received by the below-explained variable gain amplifier circuit 22 which in turn sets gains corresponding to the received signals. The variable gain amplifier circuit 22 comprises an operational amplifier OP which has its input terminals f and g respectively connected through input resistors R5 and R6 to the subtracting circuit 24 and the sample hold circuit 21. Resistors R5 through R14 determine the gains. Assuming that resistors R5, R6, R7, R8, R11 and R12 respectively have a resistance r, the resistors R9 and R13 respectively have a resistance 2r and the resistors R10 and R14 respectively have a resistance 4r. In other words, the ratio of the respective resistances of the resistors R5, R6, R7, R8, R11 and R12, and resistors R9 and R13, and resistors R10 and R14 is 1:2:4. Analog switches AS1 through AS8 receive the aforementioned signals a, b, c and d. The analog switches AS1 through AS4 respectively select resistors R7 through R10 to determine the feed-back resistance value for the operational amplifier OP, while the analog switches AS5 through AS8 respectively select the resistors R11 through R14 to determine the bias resistance value for the operational amplifier OP. The following table 3 shows the correspondence among the signals a, b, c and d that become "High", the analog switches AS1 through AS8 that are rendered conductive by the "High" signal, the resistors that are selected by the conductive switches, and the gain determined by the selected resistors.

TABLE 3

| Signal | Conductive switches | Selected resistors | Gain |
|---|---|---|---|
| a | AS1, AS5 | R7–R10, R11–R14 | X8 |
| b | AS2, AS6 | R7–R9, R11–R13 | X4 |
| c | AS3, AS7 | R7, R8, R11, R12 | X2 |
| d | AS4, AS8 | R7, R11 | X1 |

Figure 11:
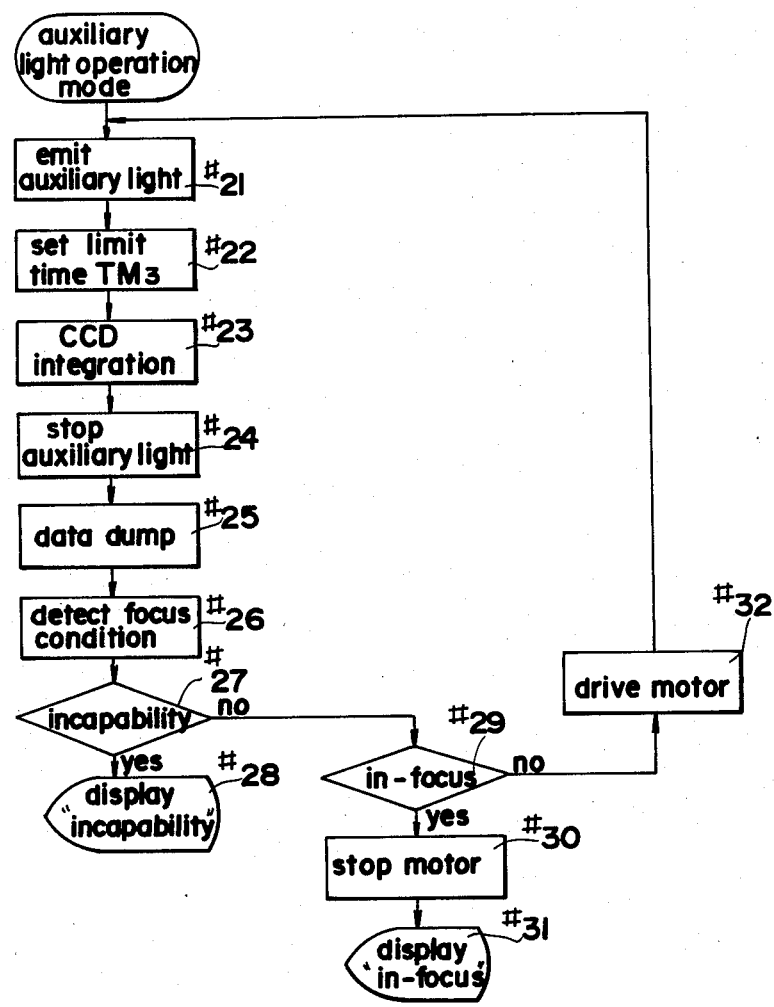
FIG. 11 is a flow chart showing the flow of the auxiliary light operation mode shown in FIG. 8.

FIG. 11 is a flow chart showing a definite flow of the auxiliary light operation mode at step #15 in the flowchart of FIG. 8. Returning back to FIG. 8, explanation will be made briefly about the flow that led to the auxiliary light operation mode at the step #15. When it is discriminated from the result of the calculation operation at step #8 that focus detection is impossible (step #9) and that the cause of the impossible focus detection is the low object brightness (Lo-LIGHT) (step #10), the flow proceeds to the step #11. If a signal indicating the readiness of the auxiliary light is supplied from the electronic flash circuit 16 to the control circuit 11 of the camera at that time, the flow proceeds to step #15 wherein focus detection is effected with the auxiliary light. With reference to FIG. 11, at step #21 the control circuit 11 of the camera supplies an auxiliary light emitting signal of a "High" level to the electronic flash circuit 16 which, in response to the signal, energizes a light emitting diode which serves as the auxiliary light emitting means. At step #22, the control circuit 11 sets the CCD integration limit time to TM3 (200 msec). Then, the integration by the CCD is effected at step #23. When the integration by the CCD is completed, the auxiliary light emitting signal which has been inverted to a "Low" level is supplied to the electronic flash circuit at step #24 to stop the light emission of the light emitting diode. At step #25, image signals OS are sequentially output from the photoconverter section 1 and the results of the subtraction DOS-OS are output as the picture element signals from the subtraction circuit 24. The picture element signals are amplified by the variable gain amplifier circuit 22 with a gain in compliance with the object brightness and the amplified signals are converted by the A/D converter circuit 23 to digital signals which are supplied through the control circuit 11 to the focus detecting circuit 5 along with the data of the gain. The focus detecting circuit 5 performs the calculation operation with the supplied data at step #26 to determine the focus condition. At step #27, the circuit 5 discriminates whether the focus detection is possible or not and calculates the amount of motor driving commensurate with the amount of defocus of the objective lens in the case the focus detection is possible. When the result of the focus calculation shows the impossibility of the focus detection, e.g., in the case the auxiliary light was emitted but enough light for the focus detection is not received by the CCD because of too long camera-to-object distance or too low reflecting power of the object, the flow proceeds from step #27 to step #28 wherein the incapability or impossibility of the focus detection is indicated. When the result of the calculation indicates the possibility of the focus detection, the flow jumps to step #29 wherein it is discriminated whether in-focus condition has been attained or not. When it is determined that an in-focus condition has been reached, the lens driving motor is stopped at step #30 and the in-focus condition is indicated at step #31. If in-focus condition has not been attained, the lens driving motor is driven by an amount that was calculated in the calculation for the focus detection, as being commensurate with the amount of defocus of the objective lens. This routine is repeated until an in-focus condition is reached.

Figure 12:
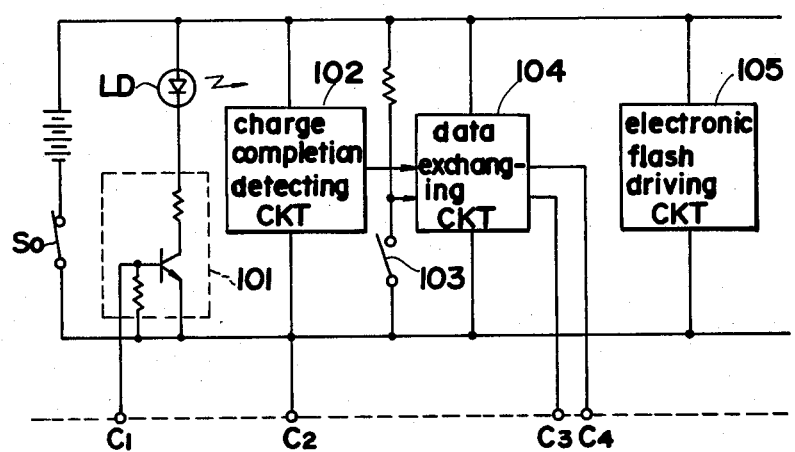
FIG. 12 is a circuit construction of an electronic flash device shown in FIG. 7.

FIG. 12 shows an embodiment of an electronic flash circuit 16 shown in FIG. 7 which is employed in an electronic flash or strobe device to be attached on the camera or built in the camera. When a power switch So is closed or turned on by a manual operation, the circuits of the electronic flash device are supplied with electric power. A light emitting diode LD is adapted to project the auxiliary light towards a target object to be photographed. A control circuit 101 controls the light emission of the light emitting diode LD for the auxiliary light. A charge completion detecting circuit 102 supplies a charge completion signal to a serial data exchanging circuit 104 when the charged voltage of a main capacitor (not shown) for energizing the electronic flash tube exceeds predetermined level. An auxiliary light switch 103 is provided on the outer frame or wall (not shown) of the electronic flash device or on the camera body in the case the electronic flash device is built in the camera. The auxiliary light switch is turned on and off by the operation of the user. The provision of the auxiliary light switch 103 is concerned with the fact that visible light such as near infrared light is used for the auxiliary light in the present embodiment. In more detail, when the auxiliary light is projected towards the object to be photographed, a spot of the auxiliary light appears on the object because the near infrared light is in the visible light range. As the result, the spot may make the user or the person as the object to be photographed, feel uneasy or the spot may appear in a picture of the same object taken by another camera, thereby causing inconvenience to the user. The above mentioned auxiliary light switch is provided for enabling the user to turn off the switch and disable such auxiliary light emission for the focus detection, and confirming the effect of influence of the light. The ON/OFF signal of the auxiliary light switch is also supplied to the serial data exchanging circuit 104. An electronic flash driving circuit 105 is adapted to effect flash firing for the photography. It is to be noted that the light emitting diode LD emits light with the spectral distribution ranging from 650 nm to 750 nm. Terminals C1 through C4 are to be connected with corresponding camera terminals when the electronic flash device is mounted on the camera. The terminal C1 is adapted for the control of the auxiliary light emitting diode LD. When a "High" level signal is applied to the terminal C1, the circuit 101 energizes the light emitting diode LD to emit light. The terminal C2 is to be grounded. The terminals C3 and C4 are for serially exchanging mutual data between the camera and the electronic flash device.

Figure 13:
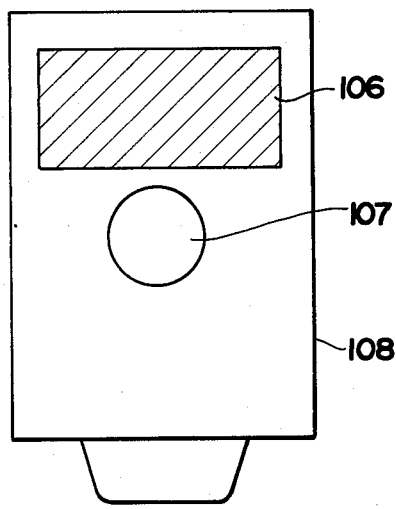
FIG. 13 is a front view of the electronic flash device shown in FIG. 7.

FIG. 13 shows the outer appearance of the electronic flash device to be used in the present embodiment. The body 108 of the electronic flash device includes a main light emission window 106 at the back of which a Xenon tube which emits flash light for the photography is disposed. The auxiliary light emitting diode LD is disposed at the back of an auxiliary light emission window 107 through which the auxiliary light is projected towards the target object when the auxiliary light emitting signal of a "High" level is applied from the camera through terminal C1 to the electronic flash circuit 16.

Figure 14:
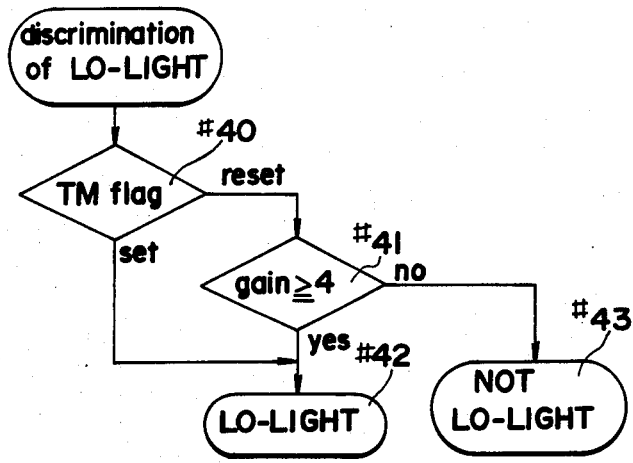
FIG. 14 is a flow chart showing the flow of the low brightness mode shown in FIG. 8.

FIG. 14 is detailed flow chart of the flow at step #10 of FIG. 8 showing how the low brightness (Lo-LIGHT) of the target object is discriminated. With reference to FIG. 14, at step #40, it is discriminated whether the CCD integration limit time has been set to TM2 (200 msec) by the TM flag. When the integration limit time is set to TM1 (50 msec), the focus detecting circuit 5 discriminates at step #41 whether the gain is less or not less than 4. If the gain is not less than 4, it is determined that the object brightness is low (Lo-LIGHT) and the flow proceeds to step #42 for the low brightness (Lo-LIGHT) operation. If the gain is less than 4, it is determined that the object brightness is not low and the flow proceeds to step #43 for the non-low-brightness (NOT Lo-LIGHT) operation. (After this the flow proceeds to focus detection impossibility indicating operation of step #16 in the flowchart of FIG. 8). When the integration limit time has been set to TM2 (200 msec), the flow immediately proceeds from step #40 to step #42 for the low brightness (Lo-LIGHT) operation.

Figure 15:
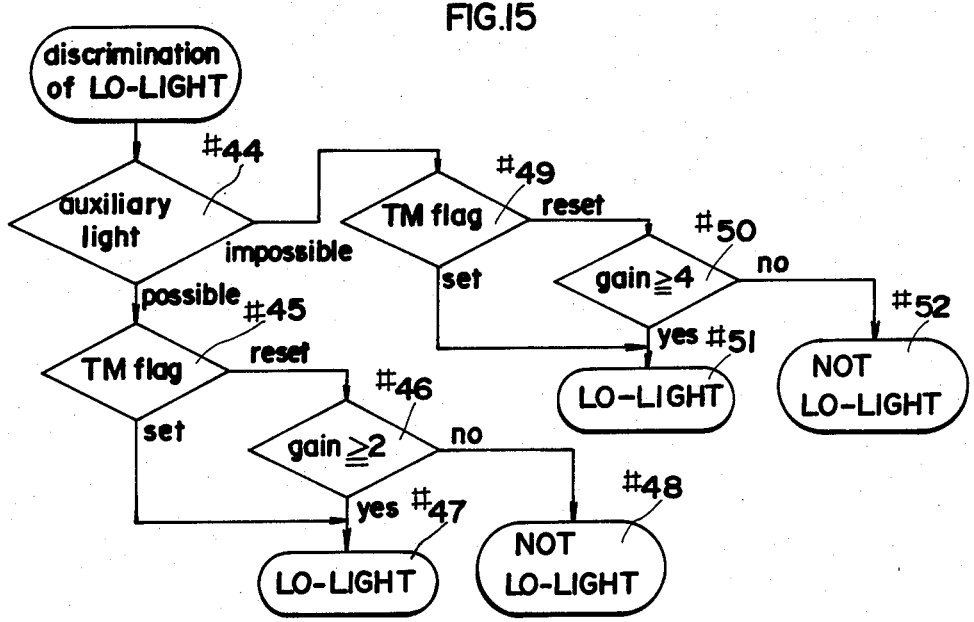
FIG. 15 is a flow chart showing another flow of the low brightness mode shown in FIG. 8.

FIG. 15 is a flowchart showing the operation in the case where the auxiliary light capable or ready signal is generated with the low object brightness (Lo-LIGHT) having been discriminated. When the auxiliary light capable or ready signal is generated, the level for discriminating the low brightness is made high, i.e., in the embodiment, the level for discriminating the gain is lowered for increasing the possibility of the low brightness (Lo-LIGHT) being discriminated. The lowering of the discrimination level is made because it is well assumed that the accuracy of focus detection increases in the focus detection with the auxiliary light rather than in the focus detection under the ordinary light. This is because an object with a low or little contrast under the ordinary light is made to have a large contract by projecting the auxiliary light onto the object. With reference to FIG. 15, when the auxiliary light capable or ready signal has not been generated, it is discriminated at step #49 whether the TM flag has been set or not. After the step, the same routine as that for the low brightness (Lo-LIGHT) discrimination in FIG. 14 will be performed. If the auxiliary light capable or ready signal is generated, it is discriminated at step #45 whether the TM flag has been set or not. If the CCD integration limit time is TM1 (50 msec), the reference level for the discrimination of the gain is set to "2" which is smaller by one step than the reference gain level in the step #41 of FIG. 14. With this lowering, the possibility of low brightness (Lo-LIGHT) increases when the auxiliary light capable or ready signal is generated. At the next step, i.e., in the flow after the discrimination of low brightness (lo-LIGHT) at step #47, the focus detection is made with the auxiliary light.

The present invention has been described with reference to a preferred embodiment but it should be noted that the invention is not limited to the embodiment. First of all, the solid state image sensor may not be limited to CCD but may be any one of BBD (Bucket Brigate Device), CID (Charge Injection Device), MOS (Metal Oxide Semiconductor) type photosensor and so forth. The focus detection system may not be limited to the type employing the focus detecting optical system as shown in FIG. 2. The present invention is applicable to other type of focus detecting system, for example, such as shown in Japanese laid-open patent applications with the laid-open numbers Sho 54-159259, 57-70504 and 57-45510. In the focus detection system shown in those Japanese laid-open applications, lens-lets are disposed on the predetermined focal plane of an objective lens or on a plane optically conjugate or equivalent to the focal plane and the solid-state image sensor is located at the back of the lens-lets such that the amount and direction of defocus representing the focus condition of the objective lens may be calculated from the outputs of the image sensor. The present invention is also applicable to another type of focus detecting optical system which is shown in the Japanese laid-open patent applications with the laid-open Nos. 55-155308, 57-72110, 57-88418 and so forth. In the system shown in those materials, solid state image sensors are located on the predetermined focal plane or a plane optically equivalent to or conjugate with the focal plane and in the front and rear, i.e., on both sides of the plane to detect only the direction of defocus.

Further, although the integration limit time TM1 was set to 50 msec and TM2 and TM3 are both set to 200 msec, they are not limited to those values. The integration limit times TM1, TM2 and TM3 may be set to any desired values within a reasonable range which does not include too long time, insofar as the relationships TM1<TM2, TM1<TM3 are established and the gain can be changed to maintain constant the output of CCD that depends on the integration time. Additionally, with respect to the auxiliary light focus detection, the light source for the auxiliary light emission may not be limited to the light emitting diode as employed in the circuit of FIG. 12. A Xenon tube with a small guide number or small lamp may be substituted for the LED. Although the auxiliary light emitting means is provided within the electronic flash device as shown in FIG. 13, the light emitting means may be located on the camera body or another device to be coupled with the camera. The auxiliary light emitting means also may be a device specially designed for that auxiliary light emission only. The switch 103 may be dispensed with if invisible light such as infrared light is used for the auxiliary light. As to the discrimination of the low brightness (Lo-LIGHT), the low brightness is determined in the above embodiment, when the gain level of the variable gain amplifier circuit 22 is not less than 4 in the normal mode and when the gain level is not less than 2 in the auxiliary light operation mode. The discrimination of the low brightness is not limited to the manner of the embodiment. Still further, in place of the brightness level discrimination from the gain level of the variable gain amplifier circuit 22, the brightness level may be discriminated on the basis of the output of a photocell which receives the light from the object to be photographed, independently of the monitoring photocell.

While there has been described a preferred form of the invention, obviously modifications and variations are possible in light of the above teachings. It is therefore to be understood that within the scope of the appended claims, the invention may be practiced otherwise than as specifically described.

What is claimed is:

1. A focus detecting device for a camera which includes an objective lens, said device comprising:

an image sensor for generating an image signal, said image sensor including photoelectric converter means for converting the intensity of light incident thereon into an amount of electric charge and charge intergration means for integrating the converted amount of charge;

a focus detection optical system for forming an image of an object on said image sensor;

integration control means for controlling integration time of said charge integration means to terminate an integration operation when the level of integrated charge reaches a given level within a first given time and terminate the integration operation upon lapse of the first given time when the level of the integrated charge doesn't reach the given level within the first given time;

amplifier means for amplifying the image signal of said image sensor by a given gain;

gain control means for controlling and determining the gain of said amplifier means in accordance with brightness of the object;

focus condition detecting means for detecting a focus condition of said objective lens in accordance with an amplified image signal from said amplifier means;

discrimination means for discriminating whether a focus condition detection is possible or not and generating a discrimination signal when the focus condition detection is impossible; and changing means responsive to the discrimination signal for replacing the first given time by a second given time which is longer than the first given time.

2. The focus detecting device according to claim 1, wherein said image sensor includes a charge coupled device.

3. The focus detecting device according to claim 1, wherein said focus detection optical system includes a pair of image forming lenses for respectively forming onto said image sensor images of the object which are passed through different portions of said objective lens, and said focus condition detecting means includes correlation detecting means for detecting correlation between two image signals representing the positions of two images formed onto said image sensor by said pair of image forming lenses.

4. The focus detecting device according to claim 1, wherein said gain control means includes gain multiplying means for making the gain double each time the brightness of the object reduces by half with the integration time being limitted to the given time.

5. The focus detecting device according to claim 1, wherein said discrimination means includes level detecting means for detecting the brightness of the object, contrast detecting means for detecting contrast of the object, and signal generating means for generating the discrimination signal when said level and contrast detecting means simultaneously detect low brightness and low contrast.

6. The focus detecting device according to claim 5, wherein said level detecting means includes a monitor photocell provided in the vicinity of said image sensor for monitoring the average intensity of light of the object.

7. The focus detecting device according to claim 6, wherein the output of said monitor photocell is commonly used for the control of said gain control means and the detection of said level detecting means.

8. The focus detecting device according to claim 6, wherein said level detecting means detects the low brightness in accordance with the integration time controlled by said integration control means and the gain determined by said gain control means.

9. The focus detecting device according to claim 1, said device further including display means for displaying the impossibility of the focus detection in response to the discrimination signal generated when the integration time is replaced by the second given time.

10. An automatic focus adjusting device for a camera which includes an objective lens, said device comprising:

an image sensor for generating an image signal, said image sensor including photoelectric converter means for converting the intensity of light incident thereon into an amount of electric charge and charge integration means for integrating the converted amount of charge;

a focus detection optical system for forming an image of an object on said image sensor;

integration control means for controlling integration time of said charge integration means to terminate an integration operation when the level of integrated charge reaches a given level within a first given time and terminate the integration operation upon lapse of the first given time when the level of the integrated charge doesn't reach the given level within the first given time;

amplifier means for amplifying the image signal of said image sensor by a given gain;

gain control means for controlling and determining the gain of said amplifier means in accordance with brightness of the object;

focus condition detecting means for detecting a focus condition of said objective lens in accordance with an amplified image signal from said amplifier means;

discrimination means for discriminating whether a focus condition detection is possible or not and generating a discrimination signal when the focus condition detection is impossible;

changing means responsive to the discrimination signal for replacing the first given time by a second given time which is longer than the first given time; and lens driving means for driving said objective lens in response to the output of said focus condition detecting means.

11. A focus detecting device for a camera which includes an objective lens, said device comprising:

an image sensor for generating an image signal, said image sensor including photoelectric converter means for converting the intensity of light incident thereon into an amount of electric charge and charge integration means for integrating the converted amount of charge;

a focus detection optical system for forming an image of an object on said image sensor;

integration control means for controlling integration time of said charge integration means to terminate an integration operation when the level of integrated charge reaches a given level within a first given time and terminate the integration operation upon lapse of the first given time when the level of the integrated charge doesn't reach the given level within the first given time;

amplifier means for amplifying the image signal of said image sensor by a given gain;

gain control means for controlling and determining the gain of said amplifier means in accordance with brightness of the object;

focus condition detecting means for detecting a focus condition of said objective lens in accordance with an amplified image signal from said amplifier means;

discrimination means for discriminating whether a focus condition detection is possible or not and generating a discrimination signal when the focus condition detection is impossible;

light emitting means for emitting a light for the focus condition detection onto the object;

emission control means responsive to the discrimination signal for controlling the light emission of said light emitting means; and changing means for replacing the first given time by a second given time which is longer than the first given time and is enough for the focus condition detection when said light emitting means emits light.

12. The focus detecting means according to claim 11, wherein said light emitting means includes a light emitting diode which emits near infrared light.

13. The focus detecting means according to claim 12, wherein said light emitting means is built in an electronic flash device.

14. The focus detecting means according to claim 11, wherein said light emitting means includes ready signal generating means for generating a ready signal representing readiness for light emission, and said emission control means includes trigger means responsive to the discrimination signal and the ready signal for triggering said light emitting means.

15. A focus detecting device for a camera which includes an objective lens, said device comprising:

an image sensor for generating an image signal, said image sensor including photoelectric converter means for converting the intensity of light incident thereon into an amount of electric charge and charge integration means for integrating the converted amount of charge;

a focus detection optical system for forming an image of an object on said image sensor;

integration control means for controlling integration time of said charge integration means to terminate an integration operation when the level of integrated charge reaches a given level within a first given time and terminate the integration operation upon lapse of the first given time when the level of the integrated charge doesn't reach the given level within the first given time;

amplifier means for amplifying the image signal of said image sensor by a given gain;

gain control means for controlling and determining the gain of said amplifier means in accordance with brightness of the object;

focus condition detecting means for detecting a focus condition of said objective lens in accordance with an amplified image signal from said amplifier means;

discrimination means for discriminating whether a focus condition detection is possible or not and generating a discrimination signal when the focus condition detection is impossible;

changing means responsive to the discrimination signal for replacing the first given time by a second given time which is longer than the first given time;

light emitting means for emitting a light for the focus condition detection onto the object;

emission control means for controlling the light emission of said light emitting means in response to the discrimination signal with the integration limit time being the second given time; and second changing means for replacing the second given time by a third given time which is longer than the first given time and is enough for the focus condition detection with the light being emitted.

16. The focus detecting device according to claim 15, wherein the third given time is set equal to the second given time.

* * * * *